United States Patent [19]

Johansson

[11] Patent Number: 5,792,313
[45] Date of Patent: Aug. 11, 1998

[54] METHOD FOR EVAPORATING PROCESS WASTEWATER

[75] Inventor: Hans Johansson, Askim, Sweden

[73] Assignee: Eka Nobel AB, Bohus, Sweden

[21] Appl. No.: 660,555

[22] Filed: Jun. 10, 1996

[30] Foreign Application Priority Data

Jun. 16, 1995 [SE] Sweden .................. 9502198

[51] Int. Cl.$^6$ .................. B01D 1/26; C23F 14/02
[52] U.S. Cl. .................. 159/47.3; 210/639; 210/697; 210/710; 48/197 A
[58] Field of Search .................. 159/47.3; 210/639, 210/696, 710; 48/197 A

[56] References Cited

U.S. PATENT DOCUMENTS 4,800,042  1/1989  Kurumada et al. .................. 159/47.3

FOREIGN PATENT DOCUMENTS

| 0 009 304 | 4/1980 | European Pat. Off. |
| 0 343 531 | 11/1989 | European Pat. Off. |
| 0 524 825 | 1/1993 | European Pat. Off. |
| 1052034 | 12/1966 | United Kingdom . |
| 1 486 366 | 9/1977 | United Kingdom . |

*Primary Examiner*—Tae Yoon
*Attorney, Agent, or Firm*—Ralph J. Mancini; Louis A. Morris

[57] ABSTRACT

In the evaporation of process wastewater comprising a mixture of different types of wastewater, problems arise due to the formation of reaction products, so-called incrustations, which are difficult to separate. These incrustations clog up the evaporator, thus necessitating frequent stoppages for chemical and mechanical cleaning of the evaporator. The invention concerns an improved method for concentrating process wastewater by evaporation. In this method, one acid process flow and one alkaline process flow are evaporated alternately in one and the same evaporator. With this method, precipitates that are difficult to separate are dissolved in the evaporator during the respective evaporations. As a result, stoppages motivated by the need to clean the evaporator may be avoided to the utmost possible extent, while less and cheaper processing equipment is required.

12 Claims, 1 Drawing Sheet

METHOD FOR EVAPORATING PROCESS WASTEWATER

This Patent Application claims priority of Sweden Patent Application No. 9502198-6, filed 16 Jun. 1995 and benefit of U.S. Provisional patent application No. 60/001, filed Jun. 20,1995.

This invention concerns an improved method for concentrating process wastewater by evaporation. In the method according to the invention, one acid process flow and one alkaline process flow are evaporated alternately in one and the same evaporator.

BACKGROUND OF THE INVENTION

In the evaporation of process wastewater comprising mixtures of different sorts of effluents, problems arise due to the formation of reaction products, so-called incrustations, which are difficult to separate. The incrustations clog up the evaporator, thus necessitating frequent stoppages for chemical and mechanical cleaning of the evaporator.

It is previously known to evaporate acid and alkaline lignocellulose-containing wastewater from a bleach plant, where the acid and the alkaline wastewater being evaporated in separate evaporators. By the use of this method, the inconvenience of foam formation is avoided, which otherwise may occur in the evaporation of mixed wastewater. However, this method has the disadvantage of requiring double sets of processing equipment. Thus, one evaporator is needed for the acid wastewater from the bleach plant and one evaporator is needed for the alkaline wastewater from the bleach plant.

The present invention now provides a method for the evaporation of process wastewater, which reduces clogging due to incrustations in the evaporator, thereby minimizing the number of stoppages and reducing the amount of processing equipment required. Also, the process itself is simplified.

SUMMARY OF THE INVENTION

Figure 1:
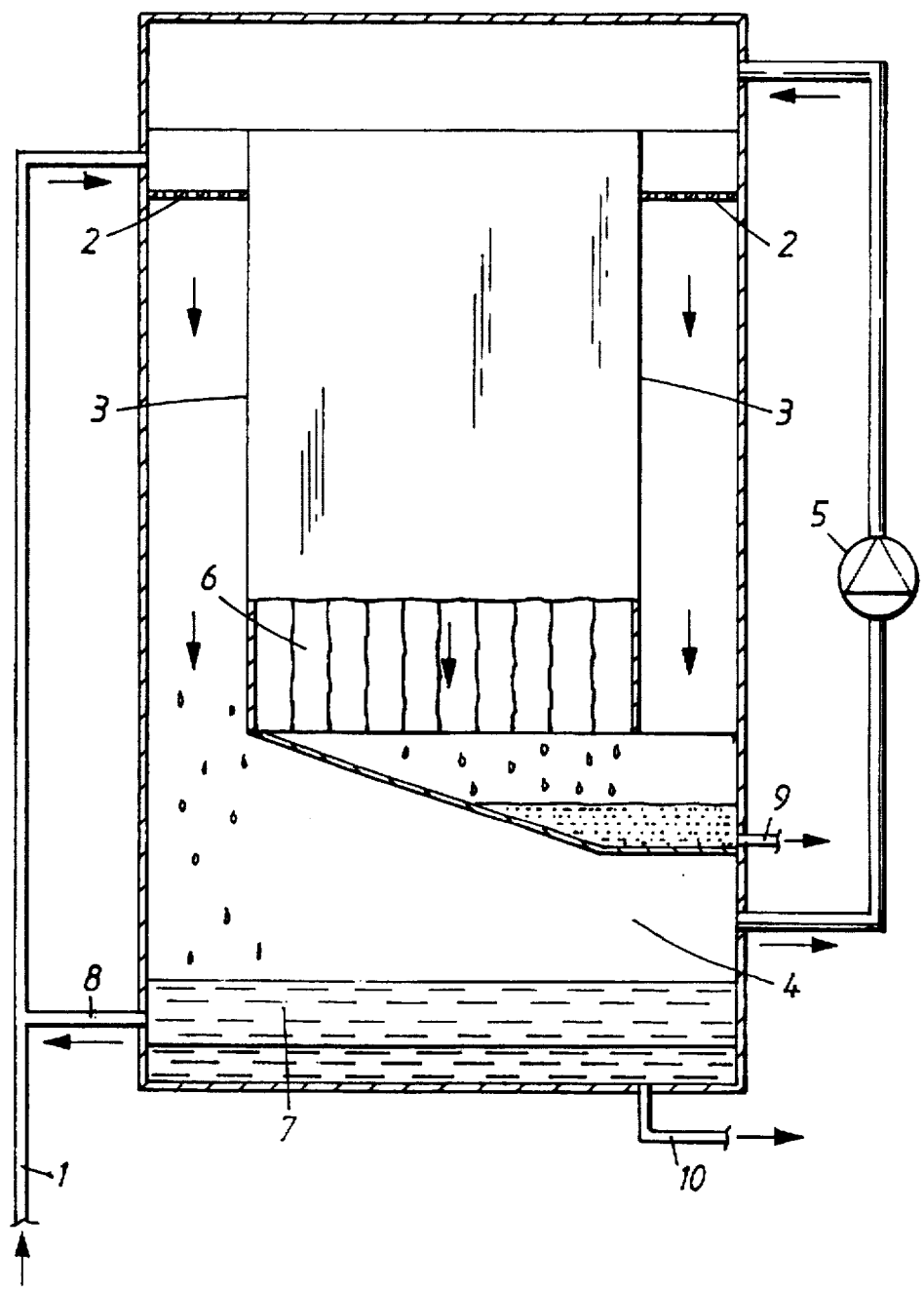
FIG. 1 is a schematic view of an evaporator suitable for carrying out the method of the present invention.

The present invention generally relates to an improved method for concentrating process wastewater, which comprises at least one acid process flow and at least one alkaline process flow, by evaporation in a single evaporator. In the method according to the invention, the acid process flow and the alkaline process flow are evaporated alternately in one and the same evaporator.

DETAILED DESCRIPTION OF THE INVENTION

The present invention generally relates to a method for evaporating process wastewater, which comprises at least one acid process flow and one alkaline process flow, wherein said process flows are concentrated alternately in one and the same evaporator, such that precipitates resulting from the evaporation of a preceding process flow is dissolved in the evaporator when the subsequent process flow is concentrated. Thus, one acid and one alkaline process flow are separately and alternately supplied to the evaporator, and the process conditions in the evaporator alternate between an alkaline and an acid state.

With the method according to the invention, precipitates that are difficult to separate are washed off the evaporator, reducing the number of stoppages required for cleaning the evaporator to the utmost possible extent, such that less and cheaper processing equipment is required. By alternately treating acid wastewater and alkaline wastewater in the evaporator, precipitates resulting from the respective treatments will be dissolved in the evaporator, since mixing and concentration involve chemical reactions, inter alia owing to changes of the pH value, such that solubility limits are successively passed. As a result, precipitates separated under alkaline conditions in the evaporator will be dissolved when there is a switch to acid conditions, and vice versa.

The process wastewater to be evaporated may originate from an industrial process and may, for instance, comprise of lignocellulose-containing wastewater from a bleach plant. In most such cases, only acid or alkaline wastewater is possible to recover and draw off from the industrial process. However, the method according to the invention enables efficient achievement of a higher degree of closing up a bleach plant, regardless of whether the bleaching involves chlorine dioxide (ECF) or a completely chlorine-free bleaching method (TCF) is employed. Thus, the method according to the invention enables evaporation of wastewater containing salt constituents of chlorides and/or chlorates.

The amount of process wastewater to undergo a concentration treatment, in for instance a bleach plant, can be in the order of 50 m3/tonne of pulp or less.

By the term "alkaline conditions" is, according to the invention, meant a pH value above 7, suitably a pH value ranging from about 7 to about 12. By the term "acid conditions" is meant a pH value below 7, suitably a pH value ranging from about 2 to about 7.

Before evaporation is carried out, the process wastewater, which contains organic and inorganic, undissolved and/or dissolved material, is suitably separated and treated in a preliminary cleaning treatment. Particulate material, such as fibres, resins, lignin, oxalates and sulphates, which may create problems in the concentration treatment, is removed from the wastewater. The particulate material can be removed by suitable separation methods, such as precipitation, filtration, centrifugation, flotation, membrane filtration, ultrafiltration or other mechanical, chemical or combined separation methods. For instance, dissolved material can be treated and precipitated by adding pH-adjusting chemicals and completing agents.

After the process wastewater optionally has been subjected to a preliminary cleaning treatment, the solution is taken to at least one stage where concentration is carried out by evaporation. In the method according to the invention, the evaporation is suitably performed in a falling-film evaporator with recirculation. Preferably, the falling-film evaporator works on the principle of mechanical vapour compression, such that no energy need normally be supplied to the evaporator from outside, in addition to the energy required by fans, pumps and other processing equipment. The energy consumption is very low. The heat-transfer elements of prior-art evaporators are made of metallic material. According to the present invention, one may resort to a new principle, according to which the heat-transfer elements partly are made of a thin and flexible sheet, of which at least the one surface consists of plastic and which preferably is shaped like a bag having a thickness of about 100 mm or less. Preferably, the foil may have thickness not exceeding about 50 mm, and most preferred a thickness not exceeding about 30 mm. The foil may have a smallest thickness of about 20 mm, suitably about 15 mm. A suitable sheet material may, for instance, consist of a mixture of plastic materials, including fillers, a copolymerisate of plastic materials, plastic mixed with carbon fibres or such plastic as e.g. polyethylene. Heat-transfer elements of plastic involve a high corrosion resistance, a low weight and a low price.

A possible mode of carrying out the invention will now be described with reference to the accompanying drawing, in which FIG. 1 shows an instance of an evaporator suitable for carrying out the method according to the invention.

Thus, FIG. 1 is a schematic view of an evaporator. Process wastewater (1) is conducted to the upper part of the evaporator, where a distributor (2) distributes the solution evenly, so that it flows down on the outside (3) of the bag construction. Any vapour (4) formed is, with the aid of a fan (5), recycled to the interior (6) of the bag construction and emits heat while condensating to liquid. Unevaporated liquid (7) on the outside of the bag construction is recycled (8) in the system. The condensate (9) formed is transferred to a condensate-cleaning stage. The concentrate (10) is drawn off to be further concentrated.

The degree of evaporation may range from about 0.5% to about 15% dry solids. Conveniently, the degree of evaporation is at least about 1% dry solids, preferably at least about 3% dry solids, and most preferred at least about 5% dry solids. Higher concentrations can be achieved by stepwise evaporation. For instance, a concentration of at least about 15% dry solids can be obtained in a last stage.

The wastewater concentrated in the evaporator contains salts, primarily oxalates and sulphates, which are precipitated in the evaporation treatment and deposit on the machinery. The fact that the deposits accumulate on the heat-transfer surfaces is especially inconvenient, since this decreases the heat transfer and the flow pattern in the evaporator. These problems are avoided by treating alternately acid and alkaline wastewater separately in the evaporator, such that the deposits (so called incrustations or precipitates) are washed away.

The acid process flow may, for instance, have the following composition: 0–2.5 g/l Na+, 0–2 g/l Cl–, 0–0.5 g/l ClO3–, as well as other anions, such as SO42–. The alkaline process flow may, for instance, have the following composition: 0–5 g/l Na+, 0–2 g/l Cl–, 0–0.5 g/l ClO3–, as well as other anions, such as OH–, HCO32–, CO32–, and SO42–. Both process flows may also contain the cations Ca and Ba. In addition, there are a great number of organic anions present.

In one embodiment of the invention, acid wastewater is evaporated in a first stage. In another embodiment of the invention, alkaline wastewater is evaporated in a first stage.

In a preferred embodiment, the concentrated solution from the evaporator is treated in an additional concentration stage. This may, for instance, be carried out by evaporation or concentration in a concentrator. A suitable prior-art evaporation method may also be used, for instance evaporation in a plate heat exchanger or a crystalliser.

Conveniently, concentration is carried out to at least about 20% dry solids, preferably to at least about 30% dry solids, and most preferred to at least about 50% dry solids. The upper limit is not critical, but is motivated primarily by reasons of process technique.

The acid and the alkaline process flow are suitably mixed after evaporation or concentration. After mixing, precipitates, inter alia oxalates, are suitably removed. The precipitates may be removed by suitable separation methods, such as precipitation, filtration, centrifugation, flotation, membrane filtration, ultrafiltration or other mechanical, chemical or combined separation methods. For instance, dissolved material can be treated and precipitated by adding pH-adjusting chemicals and complexing agents. The solution thus separated from the precipitate may then be concentrated further.

After evaporation and/or further concentration, the concentrate is drawn off to be combusted and/or subjected to an electrodialysis treatment.

In a full-size process, one or more evaporators and concentrators may be connected in parallel, in which an alternate treatment of acid and alkaline wastewater is easily arranged.

The invention is not restricted to the embodiments described above. In the description and the appended claims, the figures in % and parts are all by weight, unless otherwise stated.

I claim:

1. A method for concentrating process wastewater in an evaporator, wherein the process wastewater comprises at least one acid process flow and one alkaline process flow, said method comprising alternatively concentrating the acid process flow and the alkaline process flow in the same evaporator, wherein the precipitates resulting from the evaporation of the respective proceeding process flow are dissolved in the evaporator when the subsequent process flow is concentrated.

2. The method of claim 1 wherein further concentration is brought about by evaporation.

3. The method of claim 1 wherein the acid and alkaline process flows are mixed after the evaporation.

4. The method of claim 3 wherein solid precipitates formed during concentration are separated after mixing of the process flows.

5. The method of claim 1 wherein lignocellulose-containing wastewater from a bleach plant is the process stream to be concentrated.

6. The method of claim 1 wherein the acid process flow contains chloride-containing and/or chlorate-containing salts.

7. The method of claim 1 wherein the process flow is subjected to a preliminary cleaning treatment before the evaporation.

8. The method of claim 1 wherein the evaporation is carried out in a falling-film evaporator with recirculation.

9. The method of claim 1 wherein the degree of evaporation is at least about 5% by weight of dry solids.

10. The method of claim 1 wherein the acid process flow is evaporated in a first stage.

11. A method for concentrating process wastewater in an evaporator, wherein the process wastewater comprises at least one acid process flow and one alkaline process flow, said method comprising first concentrating the acid process flow and thereafter concentrating the alkaline process flow, wherein precipitates resulting from the evaporation of the acid process flow are dissolved in the evaporator by the subsequently added alkaline process flow.

12. A method for concentrating process wastewater in an evaporator, wherein the process wastewater comprises at least one acid process flow and one alkaline process flow, said method comprising first concentrating the alkaline process flow and thereafter concentrating the acid process flow, wherein precipitates resulting from the evaporation of the alkaline process flow are dissolved in the evaporator by the subsequently added acid process flow.

* * * * *